United States Patent
Chatal

(10) Patent No.: US 6,930,538 B2
(45) Date of Patent: Aug. 16, 2005

(54) REFERENCE VOLTAGE SOURCE, TEMPERATURE SENSOR, TEMPERATURE THRESHOLD DETECTOR, CHIP AND CORRESPONDING SYSTEM

(75) Inventor: Joël Chatal, Carquefou (FR)

(73) Assignee: Atmel Nantes SA, Nantes (FR)

( * ) Notice: Subject to any disclaimer, the term of this patent is extended or adjusted under 35 U.S.C. 154(b) by 0 days.

(21) Appl. No.: 10/616,226

(22) Filed: Jul. 9, 2003

(65) Prior Publication Data

US 2004/0036460 A1 Feb. 26, 2004

(30) Foreign Application Priority Data

Jul. 9, 2002 (FR) .......................................... 02 08650

(51) Int. Cl.[7] ................................................ G05F 1/10
(52) U.S. Cl. ...................................... 327/539; 327/513
(58) Field of Search ................................ 327/512, 513, 327/530, 534, 535, 537, 538, 543, 539

(56) References Cited

U.S. PATENT DOCUMENTS

| | | | |
|---|---|---|---|
| 5,034,626 A | * | 7/1991 | Pirez et al. .................. 327/542 |
| 5,604,427 A | | 2/1997 | Kimura |
| 5,818,294 A | * | 10/1998 | Ashmore, Jr. ................ 327/543 |
| 6,239,868 B1 | | 5/2001 | Jung et al. |
| 6,335,661 B1 | | 1/2002 | Furman |
| 6,356,161 B1 | | 3/2002 | Nolan et al. |

* cited by examiner

Primary Examiner—Jeffrey Zweizig
(74) Attorney, Agent, or Firm—Kinney & Lange, P.A.

(57) ABSTRACT

The invention relates to an electrical reference voltage source comprising: a first electrical current source (PTAT 101) adapted to produce a first current (14) proportional to a temperature; and a second electrical current source (CPTAT 102) adapted to produce a second current (15) inversely proportional to the temperature. According to the invention, the first and second current sources are installed in parallel and the voltage source comprises means (R3) of summating the first and second currents producing a reference current in the summation means generating the reference voltage (VREF) at the terminals of the summation means. The invention also relates to a temperature sensor, a temperature threshold detector, a chip and a corresponding system.

23 Claims, 5 Drawing Sheets

REFERENCE VOLTAGE SOURCE, TEMPERATURE SENSOR, TEMPERATURE THRESHOLD DETECTOR, CHIP AND CORRESPONDING SYSTEM

The domain of the invention is electronics and microelectronics. More precisely, the invention relates to bandgap reference voltage sources, providing a controlled voltage as a function of the temperature and with a low power supply voltage and a low standby current.

There are several applications of voltage sources controlled as a function of the temperature, and particularly:

reference voltage or current sources outputting a voltage or a current independent of the temperature; and temperature probes.

This type of bandgap reference voltage source is used particularly in portable equipment powered by batteries or systems using complex high performance electronic circuits. These applications have recently increased particularly with the widespread use of smart cards and built-in microcontrollers.

An integrated circuit (IC) is one basic element essential for these applications, and requires a reference voltage and current source capable of supporting most analogue functions. In this type of system, it is desirable for this voltage reference to operate at a relatively low power supply voltage, for example of the order of 1.2 to 3.0 volts. It is also desirable for it to be stable and fairly well immunised against variations of the temperature, power supply and noise.

A circuit called the bandgap reference voltage source can be used to supply this required stable reference. This type of circuit is used particularly for a variety of applications such as a power supply supervisor, a Power On Reset (POR) for a device or an analogue/digital conversion. However, one disadvantage of most reference voltage sources is that they require the use of a power supply voltage higher than the reference voltage produced (for example a power supply of the order of 2.5 volts to produce a reference voltage of about 1.25 volts).

Thus in some cases, this disadvantage is overcome by using two current sources each producing a current with opposite variations depending on the temperature:

the first source produces a first PTAT (Proportional To the Absolute Temperature) current; and the second source produces a second CPTAT (Conversely Proportional To the Absolute Temperature) current.

This type of bandgap reference voltage source based on PTAT/CPTAT currents is also described in an IEEE Journal of Solid State Circuits in an article published in May 1999 entitled "A CMOS bandgap reference circuit with sub-1-V operation" written by Hiromeri Bomba, Hitoshi Shigs, Akira Unezawa, Takeshi Miyaka, Tocu Tanazawa, Shigeru Atsumi and Koji Sakui. This reference voltage source is adapted to low voltage power supplies.

On the other hand, it has the disadvantage that it requires the use of at least three relatively high resistances to obtain a low operating current. Thus, the size of these resistances may be prohibitive in some processes, particularly processes comprising polycrystalline silicon resistances.

One particular objective of the various aspects of the invention is to overcome these disadvantages according to prior art.

More precisely, one purpose of the invention is to supply a bandgap voltage source outputting a controlled voltage as a function of the temperature and with a low power supply voltage and low standby current.

Another purpose of the invention is to provide a bandgap voltage source supplying a controlled voltage as a function of the temperature, enabling low consumption while limiting the silicon area related to the electrical resistances necessary for making the voltage source.

Yet another purpose of the invention is to enable flexible regulation of the required reference voltage as a function of the application.

Another purpose of the invention is to supply a bandgap voltage source compatible with many applications, and particularly a reference voltage source supplying a reference voltage independent of the temperature or a temperature probe based on the use of the voltage source.

These purposes and others that will become clear later are achieved according to the invention using an bandgap electrical reference voltage source comprising:

a first electrical current source adapted to produce a first current proportional to a temperature within an operating range of the source; and a second electrical current source adapted to produce a second current inversely proportional to the temperature;

remarkable in that the first and the second current sources are installed in parallel, and in that the voltage source comprises means of summating the first and second currents producing a reference current in the summation means generating the reference voltage at the terminals of the summation means.

Thus, within the operating range of the voltage source, preferably between −40° C. and +105° C., variations in the reference voltage are known as a function of the parameters of the different source elements. In some cases, the source may be made such that variations of the reference voltage within the operating range will be negligible, or even zero. Thus, very precise reference voltage sources can be obtained, for example with a precision of the order of +/−2%.

According to one particular characteristic, the voltage source is remarkable in that the summation means comprise at least one first electrical resistance through which at least part of the reference current will pass.

Thus, the summation means are relatively easy to implement, while enabling good precision in a current/voltage conversion.

According to one particular characteristic, the voltage source is remarkable in that the first current source comprises:

first current generation means adapted to produce at least one third current proportional to the temperature; and a first current mirror adapted to produce the said first current as a function of the third current(s).

According to one particular characteristic, the voltage source is remarkable in that the first current generation means comprise:

at least one first operational amplifier and at least one transistor adapted to produce the third current(s);

at least one bias resistance adapted to adjust the amplitude of the third current(s); and at least two bipole transistors coupled together such that the voltages between the base and the emitter of the transistors are connected through an equation of the diode junction type dependent on the temperature.

According to one particular characteristic, the voltage source is remarkable in that the first current generation means comprise:

an operational amplifier among the first operational amplifier(s), with first and second inputs;

a first field effect transistor adapted to produce a fourth current;

a second field effect transistor adapted to produce a fifth current;

a first bias resistance adapted to adjust the amplitude of the fifth current; and first and second bipole transistors coupled such that the voltages between the base and the emitter of the transistors are connected through a diode junction type equation dependent on the temperature, the collectors and bases of the bipole transistors being connected to a first voltage potential;

the first, second field effect transistors cooperating with a third field effect transistor to form the first current mirror such that the first current is a function of the fourth and fifth currents;

the drain of the first field effect transistor being connected to the first bipole transistor and the first input of the operational amplifier;

the drain of the second field effect transistor being connected to the second input of the operational amplifier and to a first terminal of the first bias resistance;

the second terminal of the first bias resistance being connected to the emitter of the second bipole transistor; and the output from the operational amplifier being connected to each of the gates of the first, second and third field effect transistors.

According to one particular characteristic, the voltage source is remarkable in that the said second current source comprises:

second current generation means adapted to produce at least one sixth current inversely proportional to the temperature; and a second current mirror adapted to produce the second current as a function of the sixth current(s).

According to one particular characteristic, the voltage source is remarkable in that the second current generation means comprise:

at least one second operational amplifier and at least one transistor adapted to produce the sixth current(s); and at least one bias resistance adapted to adjust the amplitude of the sixth current(s).

According to one particular characteristic, the voltage source is remarkable in that the second current generation means comprise:

an operational amplifier among the second operational amplifier(s) with first and second inputs;

a fourth field effect transistor adapted to produce a seventh current;

a second bias resistance adapted to adjust the amplitude of the seventh current;

the fourth field effect transistor forming the second current mirror with a fifth field effect transistor such that the second current is a function of the seventh current;

the drain of the fourth field effect transistor being connected to the second input of the operational amplifier and to the first terminal of the second bias resistance;

the second terminal of the second bias resistance being connected to the first voltage potential;

the first input of the operational amplifier being connected to the emitter of the first bipole transistor;

the drain of the first field effect transistor being connected to the first input of the operational amplifier among the second operational amplifier(s); and the output from the operational amplifier being connected to each of the gates of the fourth and fifth field effect transistors.

According to one particular characteristic, the voltage source is remarkable in that it also comprises:

a bias source to supply a starter current to the first and second current sources and to the summation means;

means of starting the first and second current sources and the summation means, the summation means being powered by the starter voltage.

Thus, according to the invention, the starter current prevents an equilibrium point at a zero reference voltage.

According to one particular characteristic, the voltage source is remarkable in that the starting means comprise sixth, seventh and eighth field effect transistors, the gate of each of the transistors being powered by the starter voltage and the source of each of the transistors being powered by a power supply voltage from the voltage source;

the drain of the sixth field effect transistor being connected to the drain of the first field effect transistor;

the drain of the seventh field effect transistor being connected to the drain of the second field effect transistor; and the drain of the eighth field effect transistor being connected to the drains of the third and fifth field effect transistors.

According to one particular characteristic, the voltage source is remarkable in that a variation of the second current as a function of the temperature compensates for a variation of the first current as a function of the temperature, such that the reference current is independent of the temperature.

Thus, the invention enables relatively simple use of a reference voltage source that does not depend on the temperature within a determined operating range.

According to one particular characteristic, the voltage source is remarkable in that a variation of the second current as a function of the temperature does not compensate for a variation of the first current as a function of the temperature, such that the reference current does depend on the temperature.

According to one particular characteristic, the voltage source is remarkable in that a variation in the reference current is proportional to a variation in the temperature.

Thus, the invention enables a relatively simple use of a bandgap reference voltage source for which the variation depends on the temperature according to a known and predetermined law.

The invention also relates to a temperature sensor and/or a temperature threshold detector comprising an bandgap electrical voltage source like that described above, remarkable in that the temperature sensor and/or the temperature threshold detector also comprise means of measuring the reference voltage.

According to one particular characteristic, the temperature sensor and/or the temperature threshold detector are remarkable in that the temperature sensor and/or the temperature threshold detector also comprise:

means of generating a voltage independent of the temperature within the operating range; and means of comparison of the reference voltage and the voltage independent of the temperature.

Thus, the invention enables a relatively simple use of a reliable and precise sensor and/or temperature detector.

The invention also relates to a chip comprising a bandgap voltage source like that described above.

The resistances of the voltage source according to the invention are usually relatively low and thus enable implementation in the form of a relatively economic and reliable electronic chip.

The invention also relates to a system comprising a bandgap voltage source like that described previously, and an electronic device powered by a voltage source.

According to one particular characteristic, the electronic device belongs to the group comprising:
analogue/digital and/or digital/analogue converters;
microprocessor cards;
radio-telephones;
battery charge regulation circuits;
electronic devices dedicated to vehicles;
temperature sensors;
electrical power supply supervisors;
digital/analogue and/or analogue/digital conversion devices;
reset circuits;
electronic devices dedicated to spacecraft;
electronic devices dedicated to military vehicles; and
audio or audiovisual devices.

The advantages of the temperature sensor, the temperature threshold detector, the chip and the system are the same as the advantages of the bandgap voltage source and are not described in more detail.

Other characteristics and advantages of the invention will become clear after reading the following description of a preferred embodiment, given as a simple illustrative and non-limitative example and the attached drawings, among which:

Figure 1:
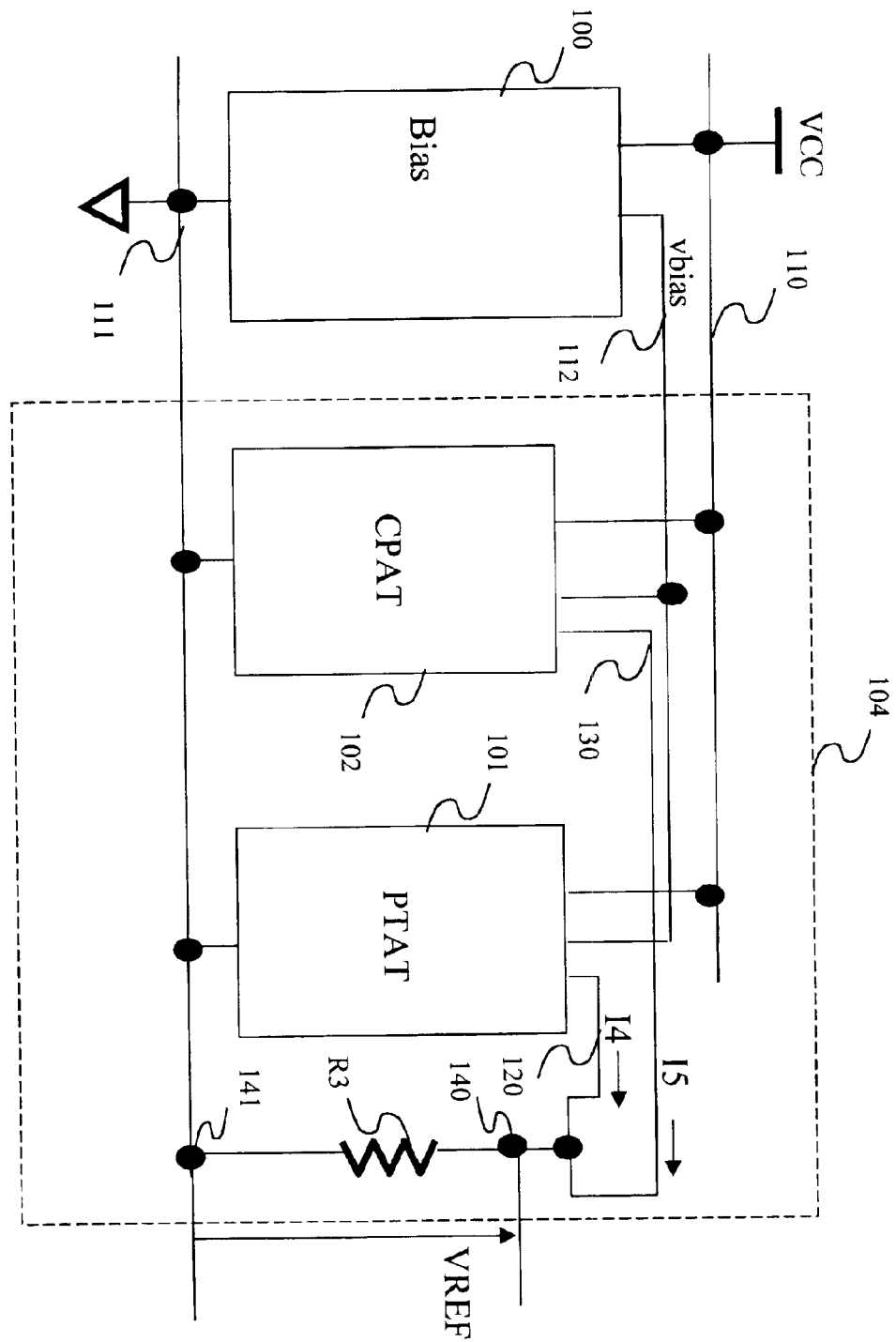
FIG. 1 shows a block diagram of one particular embodiment of the bandgap voltage source according to the invention.
Figure 3:
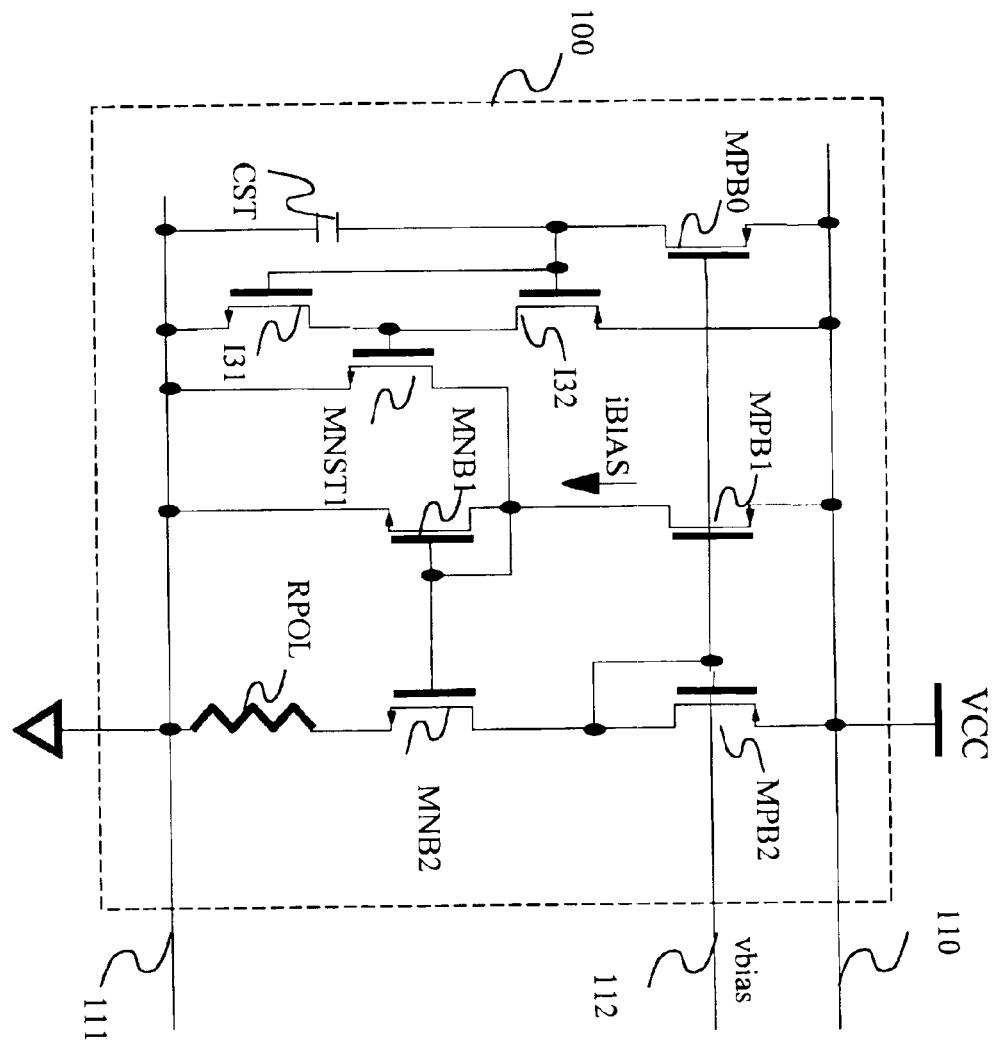
Figure 4:
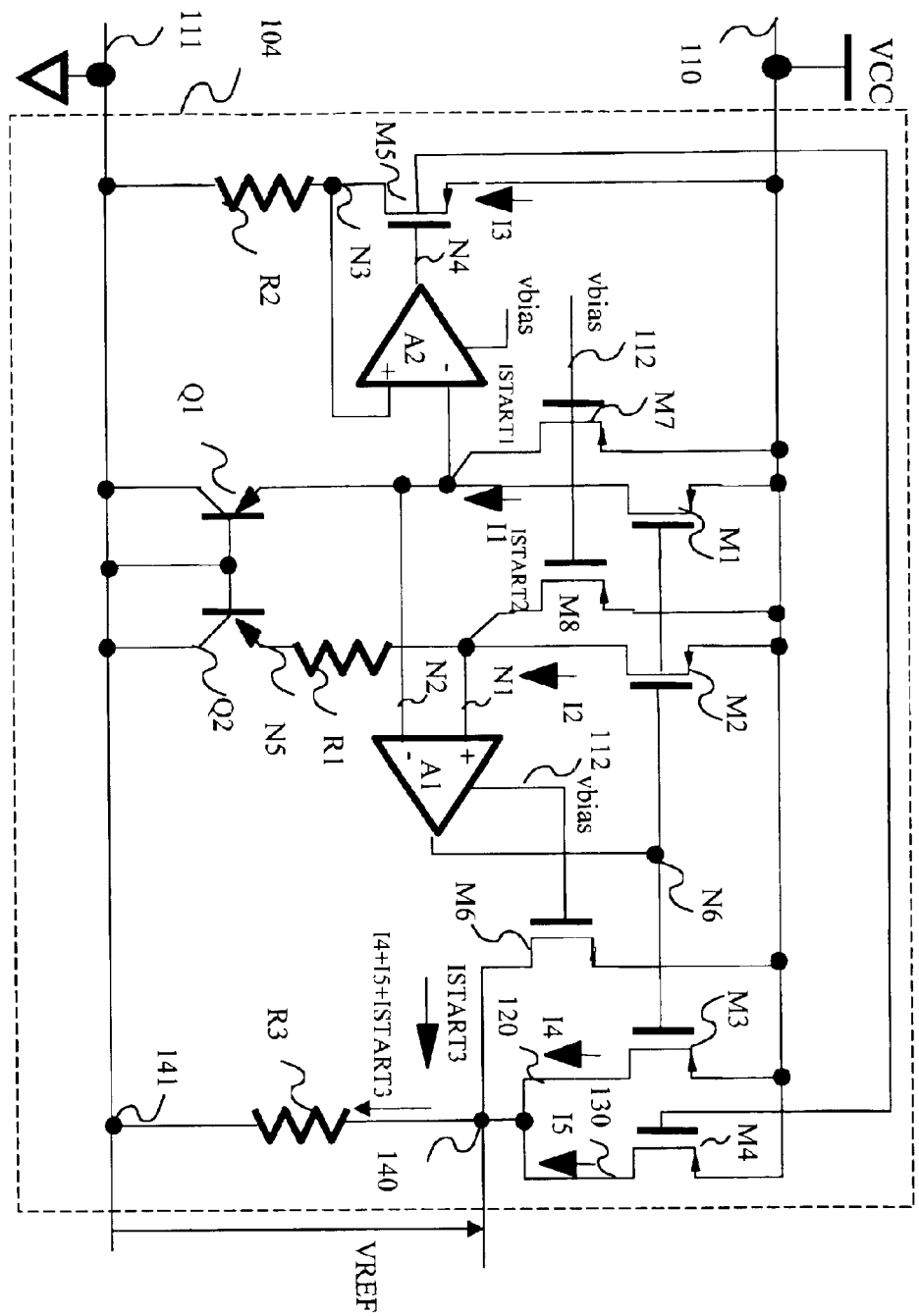
Figure 5:
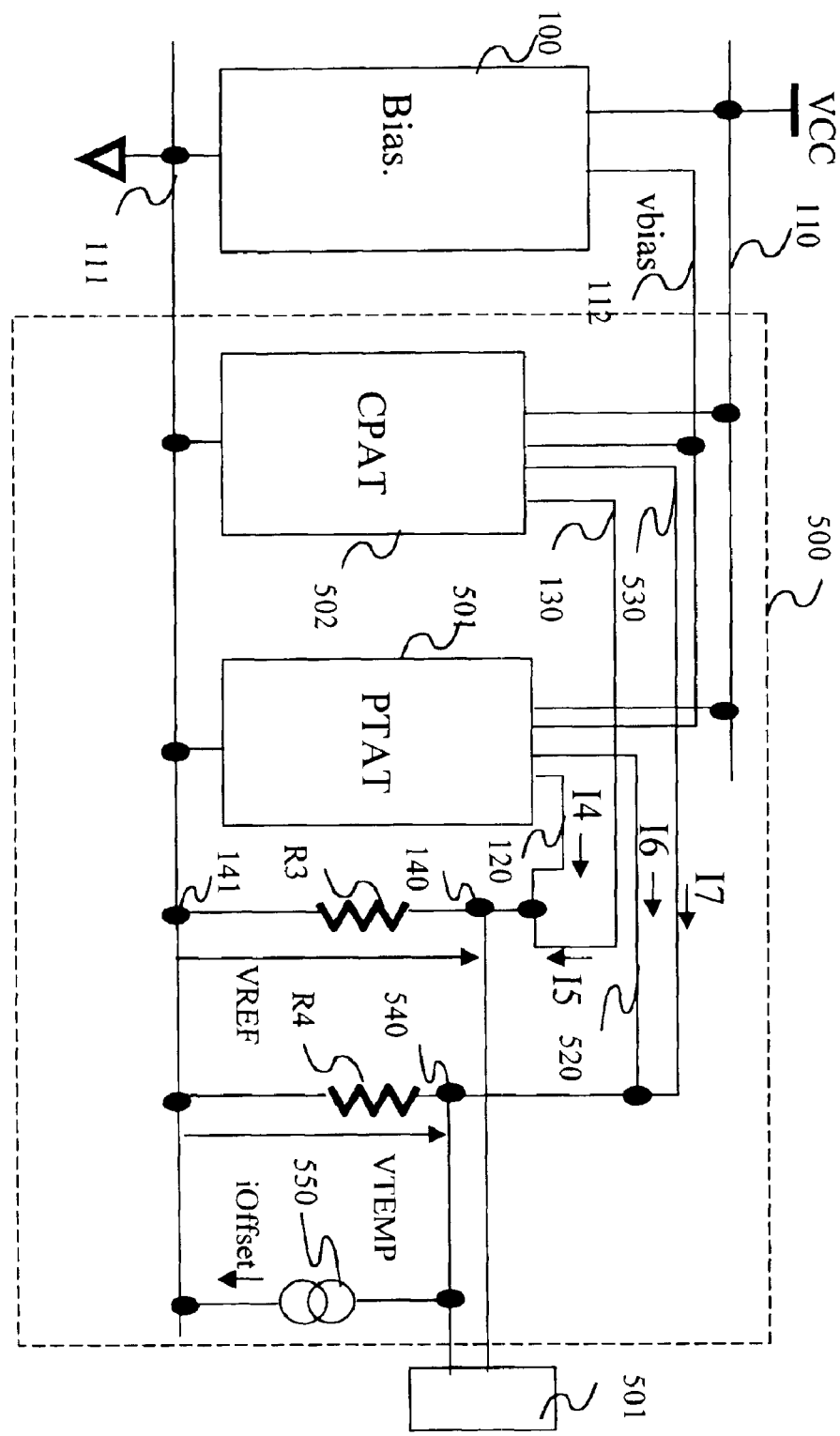

FIG. 3 describes a bias circuit like that illustrated with respect to FIG. 1;

FIG. 4 illustrates a voltage source according to FIG. 1, designed to operate with the bias circuit according to FIG. 3; and FIG. 5 illustrates a block diagram of a particular embodiment of the sensor and/or temperature threshold detector comprising a voltage source conform with the invention.

The general principle of the invention is based on a bandgap reference voltage source comprising:
a PTAT current source proportional to the absolute temperature;
a CPTAT current source conversely proportional to the absolute temperature;
summation means to add the PTAT current and the CPTAT current to produce a reference voltage at its terminals (for example, these summation means may include a summation resistance).

The PTAT and CPTAT current sources are installed in parallel so that a power supply voltage similar to the reference voltage produced can be used.

The reference voltage produced by the source can be adjusted by varying the value of a summation resistance.

When the variations of the CPTAT current as a function of the temperature precisely compensate for the variations of the PTAT current, the sum of the PTAT and CPTAT currents is independent of the temperature. In this case, the reference voltage at the terminals of the summation means through which the current passes obtained by adding the PTAT and CPTAT currents is constant, and is also independent of the temperature. Therefore, the reference voltage source can be used as a source of a voltage that does not vary with temperature.

On the other hand, when the construction is such that variations of the CPTAT current as a function of the temperature do not precisely compensate for the variations in the PTAT current, the reference current passing through the summation means also varies as a function of the temperature. In this case, the reference voltage source can be used to measure a temperature of the ambient medium. Preferably, the current sources are adapted so that current variations remain proportional to temperature variations, the sum of the PTAT and CPTAT currents then varying in proportion to the temperature variation. In this case, the reference current at the terminals of the summation means through which the current passes obtained by adding the CPTAT and PTAT currents also varies proportionally to the temperature variation. If the summation means are composed of one or several resistances, the reference voltage also varies proportionally to the temperature, which enables a relatively simple use of a temperature probe.

FIG. 1 shows a general block diagram of a voltage source device according to one particular embodiment of the invention.

The device comprises:
a bandgap voltage source 104 supplying a reference voltage VREF; and
a bias and starter module 100.

The bandgap voltage source 104 and the bias module 100 are powered by a voltage VCC 110 and are connected to a ground 111.

The bias module 100 supplies a bias and starter voltage vbias through a link 112.

The bandgap voltage source 104 comprises:
a PTAT current source proportional to the absolute temperature 101;
a CPTAT current source conversely proportional to the absolute temperature 102; and
an electrical summation resistance R3.

The current sources 101 and 102 are connected to the potential VCC through the link 110, to the ground 111 and to the bias and starter voltage vbias 112.

The PTAT current source 101 outputs a current I4 on an output 120.

The CPTAT current source 102 outputs a current I5 on an output 130.

The outputs 120 and 130 are connected to a terminal 140 of the resistance R3, the other terminal 141 of the resistance R3 being connected to the ground 111. Therefore the PTAT current I4 and the CPTAT current I5 are added in the resistance R3.

The voltage VREF is taken between the terminals 140 and 141 of the resistance R3. Thus, as indicated above, if the variation of the PTAT current as a function of the temperature is exactly compensated by the variation of the CPTAT current, the sum of the two currents passing through the resistance R3 is constant and therefore the voltage VREF supplied at the terminals of the resistance R3 is constant.

On the other hand, if the sum of the PTAT and CPTAT currents varies as a function of the temperature, the measurement of the VREF voltage at terminals 140 and 141 of the resistance R3 provides a means of determining the temperature (operation in temperature probe).

Figure 2:
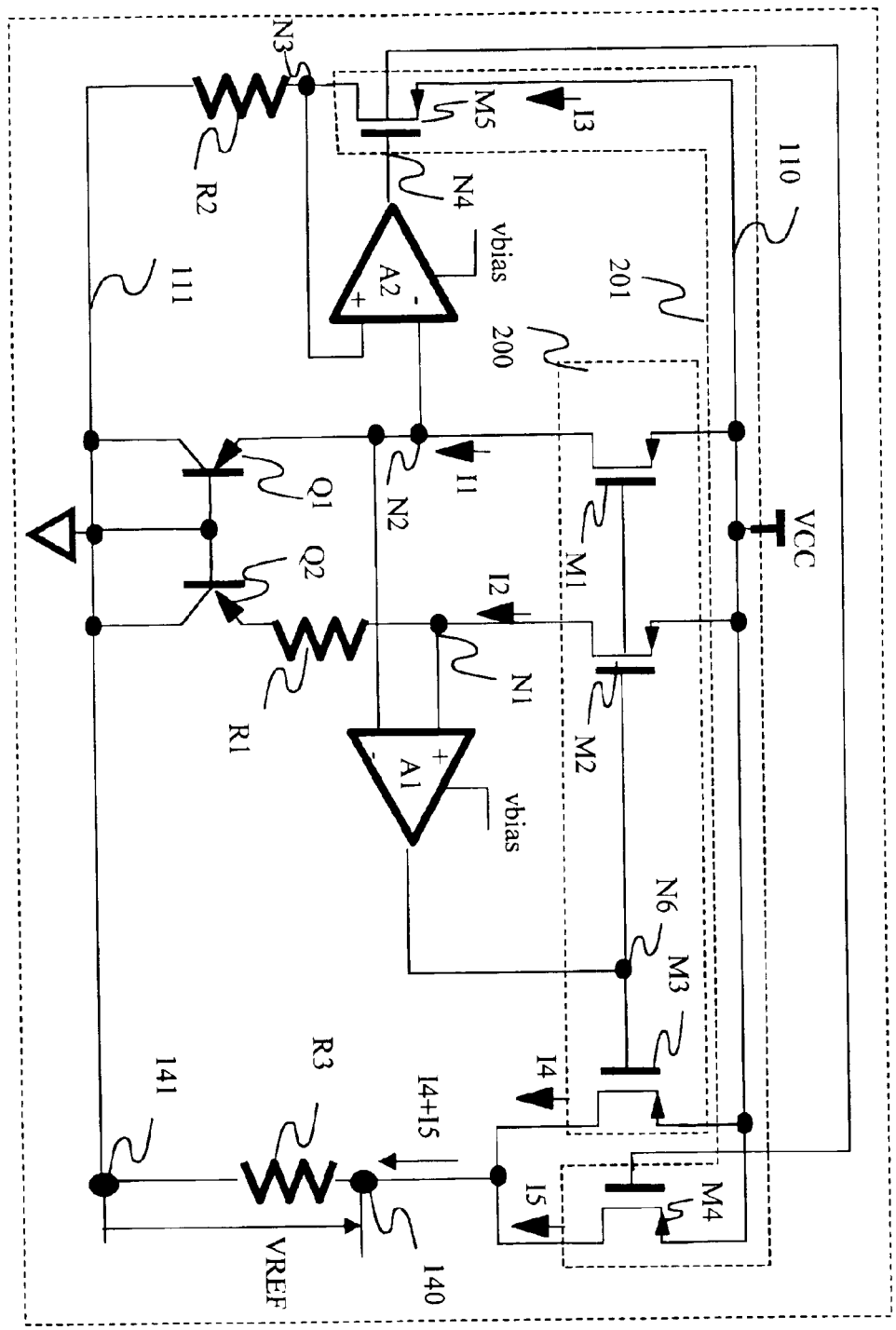
FIG. 2 illustrates the voltage source in FIG. 1 without the bias and starter circuit.

FIG. 2 illustrates the bandgap reference voltage source 104 according to one embodiment of the invention. The circuits specific to bias and starting are not shown, in order to clearly show operation of the source 104. The source 104 can operate without a starter current but in this case there is a risk that some components of the source 104 will remain energised at zero voltage. Therefore, it is preferable to impose a starter current in order to overcome this disadvantage.

As mentioned above, the reference voltage source 104 comprises:
a PTAT current source proportional to the absolute temperature 101;

a CPTAT current source conversely proportional to the absolute temperature 102; and an electrical summation resistance R3.

The PTAT current source 101 comprises:

a first current mirror 200 comprising three MOS field effect transistors (FET) M1, M2 and M3;

a resistance R1;

a pair of PNP bipole semi-conducting bipole transistors Q1 and Q2 with sizes SQ1 and SQ2 respectively; and a first operational amplifier A1.

The load resistance R3 is connected to the output from the two current mirrors 200 and 201 through terminal 140.

The MOS transistors M1, M2 and M3 are coupled so as to form the first current mirror 200:

the sources of transistors M1, M2 and M3 are connected to potential VCC (link 110);

the drain of the transistor M1 is connected to a node N2 and outputs a current I1;

the drain of transistor M2 is connected to a node N1 and outputs a current I2;

the drain of transistor M3 is connected to terminal 140 of resistance R3 and outputs a current I4; and the gates of transistors M1, M2 and M3 are connected to the output from the operational amplifier A1.

In this case, the operational amplifiers refer to devices that make a direct comparison between two voltage levels or two voltage signals and supply an amplified output voltage signal response based on a comparison of the voltage signals.

According to techniques known to those skilled in the art, the current passing through a MOSFET transistor is proportional to the width of the gate of the device. The ratio between the current I1 and the current I2 is thus determined by the ratio of the dimensions of the gates of the MOS transistors M1 and M2; similarly, the ratio between the current I1 and the current I3 is determined by the ratio of the dimensions of the gates of the MOS transistors M1 and M3. The widths of the gates of the MOS transistors M1, M2 and M3 are the same. Thus, for example:

the current I1, for example equal to approximately 1 $\mu$A passes through node N2;

the current I2, for example equal to approximately 1 $\mu$A passes through node N1;

the current I4, for example equal to approximately 1 $\mu$A passes through the MOS transistor M3;

The gates of MOS transistors M1, M2 and M3 are electrically coupled to the voltage comparison at node N6, generated by amplifier A1. Since the voltage at node N6 is supplied by amplifier A1, the gate-source voltages of MOS transistors M1, M2 and M3 are approximately equal and the MOS transistors M1, M2 and M3 operate at or close to a saturation region during operation of the voltage source 104.

The negative input to amplifier A1 is connected to node N2 while the positive input of amplifier A1 is connected to node N1. The output from the amplifier A1 is connected to node N6. The amplifier A1 is powered through the vbias voltage. Thus, the amplifier A1 compares the voltage between nodes N2 and N1.

By activating the MOS FET transistor M2 to output a current I2, the amplifier A1 causes the creation of a voltage VR1 at the terminals of the resistance R1. Furthermore, the consequence of reinjecting the voltage VN2 supplied to amplifier A1 is that the electrical voltages at nodes N1 and N2 are approximately equal.

Two PNP bipole transistors Q1 and Q2 are coupled at currents I1 and I2 respectively. The emitter of transistor Q1 is directly connected to node N2. The emitter of transistor Q2 is connected to node N1 through a resistance R1. The collector and the base of transistors Q1 and Q2 are connected to the ground 111.

The relation of transistors Q1 and Q2 approximately follows a diode junction equation. The base-emitter voltage on each transistor in the pair of PNP transistors Q1 and Q2 is provided by the equation:

$$VBE\_Q1=VBE\_Q2+kT/q*ln(J1/J2) \qquad (1)$$

where:

J1 is the current density passing through transistor Q1;

J2 is the current density passing through transistor Q2;

kT/q is the thermal voltage, where k is Boltzman's constant, T is the absolute temperature and q is the charge of the electron (1.6×10$^{-19}$ coulombs);

VBE_Q1 is the base-emitter voltage of transistor Q1;

and VBE_Q2 is the base-emitter voltage of transistor Q2.

The current densities J1 and J2 may be adjusted by modifying the ratio of the surface areas of the emitters of transistors Q1 and Q2. In the described embodiment, the currents I1 and I2 are identical and the surface area of the emitter of transistor Q2 is equal to at least eight times the surface area of the emitter of transistor Q1.

Furthermore, since the voltages on nodes N1 and N2 are approximately equal, the base-emitter voltage at the terminals of the PNP transistor Q1 is approximately equal to the base-emitter voltage at the terminals of the PNP transistor Q2, to which the voltage at the terminals of the resistance R1 is added. A voltage difference between the base-emitter voltages VBE_Q1 and VBE_Q2 of the PNP transistors Q1 and Q2 respectively, appears in the form of a voltage V_R1 at the terminals of the load resistance R1 according to the following relation:

$$V\_R1=VBE\_Q1-VBE\_Q2 \qquad (2)$$

Equations (1) and (2) can be combined to give:

$$V\_R1=kT/q\times ln(J1/J2) \qquad (3)$$

Since the width and the length of the MOS devices M1, M2 and M3 in the current mirror 104 are identical, the currents in transistors M1, M2 and M3 are given by:

$$I\_PTAT=(kT/qR1)\times ln(J1/J2) \qquad (4)$$

For example, if:

the value of the resistance R1 is fixed at 56 k$\Omega$;

the ratio of the sizes of the emitters of PNP devices Q1/Q2 is equal to 8; and the ratio of the sizes of the MOS devices M1/M2 is equal to 1;

then, according to relation (3), voltage V_R1 is equal to:

$$V\_R1=(kT/q)\cdot ln(8)=(1.38\times10^{-23}300/1.6\times10^{-19})ln8=54mV$$

at a temperature T=300K; and according to relation (4), the I_PTAT current is equal to V_R1/R1=1 $\mu$A.

The CPTAT current source 102 comprises:

a second current mirror 201 comprising two MOS field effect transistors M4 and M5;

a second operational amplifier A2 with a current mirror controlling the output 130; and a load resistance R2 connected to a reinjection input.

The CPTAT current source 102 is used:

firstly as a voltage follower to output a voltage VNG equal to the voltage at the terminals of the PNP device Q1;

then as a current source with a "negative temperature coefficient" to supply a current through the second current mirror 201 equal to the current in the resistance R2.

The MOS transistors M4 and M5 are coupled so as to form the second current mirror 201, the source and gate of the transistor M5 being connected to the source and gate of the transistor M4 respectively:

the sources of transistors M4 and M5 are connected to the potential VCC (link 110);

the drain of transistor M5 is connected to a node N3 and outputs a current I3;

the drain of transistor M4 is connected to the terminal 140 of the resistance R3 and outputs a current I5; and the gates of transistors M4 and M5 are connected to the output from the operational amplifier A2.

The ratio between the current I3 and the current I5 is determined by the ratio of the dimensions of the gates of MOS transistors M4 and M5. The widths of the gates of MOS transistors M4 and M5 are exactly the same such that the current I5 in transistor M4 is identical to the current I3 in transistor M5.

Thus, for example:

current I3, for example equal to approximately 1 $\mu$A, passes through node N3; and current I5, for example equal to approximately 1 $\mu$A, passes through the MOS transistor M3.

The gates of MOS transistors M4 and M5 are electrically coupled to the voltage comparison at node N4 output by amplifier A2. The voltage at node N4 is supplied by amplifier A2, therefore the gate-source voltages of MOS transistors M4 and M5 are approximately equal and the MOS transistors M4 and M5 operate at or close to a saturation region during operation of the voltage source 104.

The positive input to amplifier A2 is connected to node N3, while the negative input of amplifier A2 is connected to node N2. The output from amplifier A2 is connected to node N4. The amplifier A2 is powered through the voltage vbias.

The resistance R2 connects the ground 111 to node N3 corresponding to the output from a voltage follower.

The voltage follower is connected using the amplifier A2 and the MOS transistor M5.

The amplifier A2 and the first part of the second current mirror 105 are connected as follows, to form the voltage follower:

the negative input to amplifier A2 is connected to transistor Q1 through node N2;

the positive input to amplifier A2 is connected to the drain of transistor M5 and to the load resistance R2 through the node N3;

the output from amplifier A2 is connected to the gate of transistor M5 through a node N4; and the source of the transistor M5 is connected to the power supply VCC through the link 110.

Since the width and length of M5 and M4 are identical, the current in the resistance R2 and the mirror 201 is then supplied by the equation:

$$I\_CPTAT=VBE\_Q1/R2 \quad (5)$$

where VBE_Q1 represents the base-emitter voltage of transistor Q1.

For example, R2 is preferably between 100 and 500 k$\Omega$, and for example may be fixed at 420 k$\Omega$, and thus I_CPTAT is equal to 1.9 $\mu$A.

The resistance R3 is used to add the I_PTAT and I_CPTAT currents. Relations (4) and (5) can be combined, so that the voltage at the terminals of resistance R3 is given by the equation:

$$VREF=R3\times(VBE\_Q1/R2+(kT/qR1)\times\ln(J1/J2)) \quad (6)$$

Thus VREF is the sum of two terms:

a voltage proportional to VBE_Q1 and which therefore varies conversely to temperature variations (VBE_Q1 goes down when the temperature T goes up); and a voltage that varies proportionally to the temperature.

For illustration purposes, according to the embodiment described, the values of parameters related to the components used are as follows:

the values of resistances R1, R2 and R3 are preferably between 100 and 500 k$\Omega$, and for example their values may be 56 k$\Omega$, 420 k$\Omega$ and 332 k$\Omega$ respectively;

the ratio of the surface area of the emitter of Q2 to the surface area of the emitter of Q1 is equal to 8; and the width W of the gate of transistors M1, M2, M3, M4 and M5 is equal to 120 $\mu$m and the gate length L is equal to 40 $\mu$m.

Thus, at a temperature T equal to 300 K, the voltage VBE_Q1 is close to 0.6V (half the prohibited band of silicon for bipole transistors) and according to relation (6):

$$VREF=332\times10^3(VBE\_Q1/420c10^3+54\times10^{-3}/56\times10^3) \#332(0.6/420+10^{-3}) \text{ namely } VREF=0.8 \text{ V.}$$

FIG. 3 describes a bias and starter circuit 100 like that described with reference to FIG. 1. The bias and starter circuit 100 is a current source which has the advantage of supplying a stable current when the power supply voltage VCC varies. Thus, the current in each of the amplifiers A1 and A2 is also stable, which enables stable performances (particularly in terms of offset) and a good precision of the supplied reference voltage.

The bias and starter circuit 100 comprises:

transistors MPB0, MPB1, MPB2, I31, I32, MNST1, MNB1 and MNB2;

an electrical resistance RPOL; and a capacitor CST.

The source of each of the transistors MPB0, MPB1, MPB2 and I32 is connected to the power supply voltage VCC;

MNB1 and MNB2 are composed of 4 and 16 identical transistors, respectively, installed in parallel. Only one transistor MNB1 and one transistor MNB2 have been shown facing FIG. 3, in order to simplify the view.

The gate of each transistor MPB0, MPB1 and MPB2, and the drain of transistor MNB2 are connected to bias circuit 100.

The drain of transistor MPB1 is connected to the drain of each of transistors MNST1 and MNB1 and to the gate of each of transistors MNB1 and MNB2. The drain of transistor MPB1 outputs a current iBIAS;

The drain of transistor MPB0 is connected to one of the terminals of the capacitor CST (the other terminal of this element being connected to the ground 11) and to the gate of each of the transistors I31 and I32.

The drain of transistor I32 is connected to the gate of transistor MNDT1 and to the drain of transistor I31.

The source of each transistor MNST1 and MNB1 is connected to the ground 111.

The source of each transistor MNB2 is connected to one of the terminals of the resistance RPOL, and the other terminal of this resistance is connected to the ground 111.

The currents output by transistor MPB1 (denoted I_MPB1) and by transistors MNB1 (denoted I_MNB1) are given by the relation:

$$iBIAS=I\_MPB1=I\_MNB1=(1-n/m)^2/(n\times uC0/2\times W/L\_NB1\times RPOL^2)$$

where
m=(W/L_NB2)/(W/L_NB1)
n=(W/L_PB2)/(W/L_PB1)
and in which:

parameters L_NB1 and L_NB2 represent the gate lengths (in other words the distance between the drain and the source) of the transistors MNB1 and MNB2 respectively; and the parameter W is their length.

This type of current source requires a starter circuit. The starter circuit is made by transistor MNST1. MNST1 is deactivated by transistor 131 after capacitor CST has been charged at voltage VCC by transistor MPB0.

As an illustrative example, the values of parameters of components of the bias circuit 100 according to the described embodiment may be as follows:

the capacitance of the capacitor CST is greater than or equal to 1 pF to avoid parasite capacitances, and for example is chosen to be equal to 1 pF;

the integrated poly-silicon resistance RPOL is equal to 120 kΩ;

the width of the gate of transistors MPB0, MPB1 and MPB2 is equal to 10 μm and their length is equal to 1.26 μm;

the width of the gate of transistors I31 and I32 is equal to 2.5 μm and 5 μm respectively, and their length is equal to 0.35 μm;

the width of the gate of transistor MNST1 is equal to 4.9 μm and its length is equal to 0.35 μm;

the width and length of the gate of each transistor MNB1 and MNB2 are equal to 26 μm and 1.2 μm respectively.

FIG. 4 illustrates a voltage source 104 according to FIG. 1 designed to operate with the bias circuit 100 described with reference to FIG. 3.

The voltage source 104 in FIG. 4 comprises:

elements of the voltage source 104 illustrated with regard to FIG. 2; and the FET transistors M6, M7 and M8.

Elements common to the voltage sources illustrated with reference to FIGS. 2 and 4 are the same, and consequently they will not be described further.

Transistors M6, M7 and M8 enable satisfactory startup of the voltage source 104. For example, the width of the gate of transistors M6, M7 and M5 is equal to 10 μm and their length is equal to 1.26 μm, these dimensions being identical to the dimensions of transistors MPB0, MPB1 and MPB2.

The source of each of the transistors M6, M7 and M8 is connected to the power supply VCC.

The gate of each of the transistors M6, M7 and M8 is connected to the bias voltage vbias.

Therefore the transistors M6, M7 and M8 are installed as a current mirror.

The drain of transistor M7 is connected to node N2 and outputs a current ISTART1, and the drain of transistor M8 is connected to node N1 and outputs a current ISTART2.

The drain of transistor M6 is connected to node 140 and outputs a current ISTART3 similar to ISTART2 and ISTART1.

The amplifier A1 of the PTAT source acts on node N6 so that the potentials at points N1 and N2 respectively are identical. In theory, there are two operating points at which the potentials at points N1 and N2 are identical:

an unwanted point with zero current; and
a suitable point with a non zero current.

The starter current 100 is a means of providing a non zero current at points N1 and N2 and therefore avoiding the operating point at zero current.

Furthermore, the sum of the three currents I4, I5 and ISTART3 passes the resistance R3.

FIG. 5 shows a diagram of the temperature sensor and/or temperature threshold detector comprising a voltage source adapted to the temperature measurement.

The sensor and/or detector comprise elements similar to the elements in the voltage source illustrated with reference to FIG. 1; therefore these elements have the same references and will not be described further.

In particular, it comprises:

a bias circuit 100;
a voltage source 500; and
a measurement and/or detection module 501.

The bias circuit 100 is adapted to output a bias voltage vbias at the voltage source 500.

The voltage source 504 is adapted to output two voltages:

a reference voltage VREF independent of the temperature; and
a voltage VTEMP to determine an ambient temperature.

The voltage source 504 comprises:

a PTAT current source proportional to the absolute temperature 501;
a CPTAT current source conversely proportional to the absolute temperature 502;
two electrical summation resistances R3 and R4; and
a current source 550.

The PTAT current source 501 and the CPTAT current source 502 form part of the sensor and/or detector that is immersed in the medium for which the temperature is to be measured and/or to detect a value exceeding a predetermined threshold. According to the embodiment described, the bias circuit 100, the module 501, resistances R3 and R4 and the source 550 do not form part of the sensor itself and are separate from it. According to one variant, the sensor and/or detector are made in a single block and all elements in the bias circuit 100, the source 500 and the module 501 belong to the sensor that is immersed in the medium for which the temperature is to be measured and/or to detect a temperature value exceeding a predetermined threshold.

The current sources 501 and 502 are connected to the potential VCC through the link 110, to the ground 111 and to the bias and starter voltage vbias 112.

The PTAT current source 501 provides:

a current I4 on an output 120; and
a current I6 on an output 520.

The PTAT current source 501 is similar to the source 101 previously illustrated with reference to FIGS. 2 and 4, except for the current mirror 200 that also comprises a transistor M33 for which the source and the gate are connected in parallel to the source and gate respectively of transistor M3.

The surface area of the gate of transistor M33 is not the same as the surface area of the gate of transistor M3. Thus, the currents I4 and I6 output by transistors M3 and M33 respectively are different. If the gate of M33 is larger than the gate of M3, the current I6 will vary with a positive temperature coefficient.

The CPTAT current source outputs:

a current I5 on an output 130; and
a current I7 on an output 520.

The CPTAT current source 502 is similar to the source 102 previously illustrated with reference to FIGS. 2 and 4, except for the current mirror 201 that also comprises a transistor M44 for which the source and the gate are connected in parallel to the source and the gate respectively of transistor M4.

Transistors M4 and M44 have identical gate widths and lengths. Thus, the current I7 output by transistor M44 is identical to the current I5 output by transistor M4.

The outputs 120 and 130 and the output from transistor M6 are connected to a terminal 140 of the resistance R3, the other terminal 141 of the resistance R3 being connected to the ground 111. Therefore, the three currents (PTAT I4, CPTAT I5 and ISTART3) are added in resistance R4.

The voltage VREF is taken between terminals 140 and 141 of the resistance R3. Thus, the variation of the PTAT current as a function of the temperature is exactly compensated by the variation of the CPTAT current, and in this case the sum of the three currents passing through the resistance R3 is constant and therefore the voltage VREF output at the terminals of the resistance R3 is constant.

The voltage VTEMP is taken between terminals 540 and 141 of the resistance R4. The sum of the PTAT and CPTAT currents varies as a function of the temperature, therefore a measurement of the voltage VTEMP at the terminals 540 and 141 of the resistance R4 provides a means of determining the temperature.

An iOffset current source 550 between terminals 540 and 141 is used to adjust the offset of the temperature probe through the voltage VTEMP. Thus, the sensor and/or detector can be calibrated as a function of a reference temperature (for example a zero voltage difference can be chosen between VREF and VTEMP at a temperature T equal to 300K).

The measurement and/or detection module 501 comprises two inputs connected to the following terminals, respectively:

140 (at potential VREF independent of the temperature); and 540 (at potential VTEMP depending on the temperature).

Thus, for operation as a temperature probe, the measurement module 501 comprises an analogue/digital converter, for example with a precision of 10 bits, and outputs a value of the voltage difference (VTEMP-VREF) to a digital output on 10 bits, and this value can be converted directly into a temperature value.

Similarly, for operation in temperature threshold detection, the measurement module 501 includes a comparator between voltages VTEMP and VREF and outputs a value equal to one if the measured temperature is greater than a predetermined temperature threshold (value of the temperature when the two voltages VTEMP and VREF are equal), or otherwise zero, on a single-bit digital output.

Obviously, the invention is not limited to the example embodiments mentioned above.

In particular, an expert in the subject will make a number of variants to the definition of the bias circuit to supply a constant starter and bias voltage.

Furthermore, there are many variants for PTAT and CPTAT current sources. For example, the bipole transistors Q1 and Q2 could be replaced by MOS transistors.

Note that the voltage source is not limited to supplying the reference voltage VREF independent of the temperature, but it may provide a reference voltage VREF for which the variation is known as a function of the temperature and which can be used for many applications, for example for temperature probes, and for battery charge devices (the charge voltage also varying with the temperature).

Temperature sensors and temperature detectors are not limited by the embodiment of the invention illustrated with reference to FIG. 5, but include all variants capable of supplying a voltage dependent on the temperature according to a known law. In particular, the invention concerns variants of the device illustrated with reference to FIG. 5 using at least two combined voltage sources (case of the embodiment in FIG. 5) or adjacent sources (in other words separate or independent) in which one voltage source independent of the temperature within the operating range of the device and at least one voltage source outputting at least one voltage that is dependent on the temperature. It also applies to variants for supplying at least one voltage dependent on the temperature, for example using components for controlling the voltage as a function of the temperature (for example transistors with appropriate surface areas or appropriate resistances).

What is claimed is:

1. A bandgap electrical reference voltage source (104) comprising:

a first electrical current source (PTAT 101) adapted to produce a first current (I4) proportional to a temperature within an operating range of the source; and a second electrical current source (CPTAT 102) adapted to produce a second current (I5) inversely proportional to the temperature;

characterised in that the first and second current sources are installed in parallel, and in that the voltage source comprises means (R3) of summating the first and second currents producing a reference current in the summation means generating the reference voltage (VREF) at the terminals of the summation means;

wherein the first current source comprises:

first current generation means adapted to produce at least one third current (I1, I2) proportional to the temperature; and a first current mirror adapted to produce the first current (I4) as a function of the at least one third current (I1, I2); and wherein the first current generation means comprises:

at least one first operational amplifier (A1) and at least one transistor (M1, M2) adapted to produce the at least one third current;

at least one bias resistance (R1) adapted to adjust the amplitude of the at least one third current; and at least two bipole transistors (Q1, Q2) coupled together such that the voltages between the base and the emitter of the transistors are related through an equation of the diode junction type dependent on the temperature.

2. Electrical voltage source according to claim 1, characterised in that the summating means comprise at least one first electrical resistance (R3) through which at least part of the reference current (I4+I5) will pass.

3. Electrical voltage source according to claim 1, characterised in that the first current generation means comprise:

an operational amplifier (A1) among the at least one first operational amplifier, with first and second inputs;

a first field effect transistor (M1) adapted to produce a fourth current (I1);

a second field effect transistor (M2) adapted to produce a fifth current (I2);

a first bias resistance (R1) adapted to adjust the amplitude of the fifth current; and first and second bipole transistors (Q1, Q2) coupled such that the voltages between the base and the emitter of the transistors are connected through a diode junction type equation dependent on the temperature, the collectors and bases of the bipole transistors being connected to a first voltage potential;

the first and second field effect transistors cooperating with a third field effect transistor (M3) to form the first current mirror such that the first current (I4) is a function of the fourth and fifth currents;

the drain of the first field effect transistor being connected to the first bipole transistor and the first input of the operational amplifier;

the drain of the second field effect transistor being connected to the second input of the operational amplifier and to a first terminal of the first bias resistance;

the second terminal of the first bias resistance being connected to the emitter of the second bipole transistor; and the output from the operational amplifier being connected to each of the gates of the first, second and third field effect transistors.

4. Electrical voltage source according to claim 1, characterised in that a variation of the second current as a function of the temperature compensates for a variation of the first current as a function of the temperature, such that the reference current is independent of the temperature.

5. Electrical voltage source according to claim 1, characterised in that a variation of the second current as a function of the temperature does not compensate for a variation of the first current as a function of the temperature, such that the reference current does depend on the temperature.

6. Electrical voltage source according to claim 5, characterised in that a variation in the reference current is proportional to a variation in the temperature.

7. Temperature sensor and/or temperature threshold detector comprising an electrical voltage source (500) according to claim 5, characterised in that the temperature sensor and/or the temperature threshold detector also comprise means (501) of measuring the reference voltage (VTEMP).

8. Temperature sensor and/or temperature threshold detector according to claim 7, characterised in that the temperature sensor and/or the temperature threshold detector also comprise:

means of generating a voltage (VREF) independent of the temperature within the operating range; and means (501) of comparison of the reference voltage and the voltage independent of the temperature.

9. Electronic chip comprising a voltage source according to claim 1.

10. System comprising a voltage source according to claim 1 and an electronic device powered by the voltage source.

11. System according to claim 10, characterised in that the device belongs to the group consisting of:

analogue/digital and/or digital/analogue converters;

microprocessor cards;

radio-telephones;

battery charge regulation circuits;

electronic devices dedicated to vehicles;

temperature sensors;

electrical power supply supervisors;

digital/analogue and/or analogue/digital conversion devices;

reset circuits;

electronic devices dedicated to spacecraft;

electronic devices dedicated to military vehicles; and audio or audiovisual devices.

12. A bandgap electrical reference voltage source (104) comprising:

a first electrical current source (PTAT 101) adapted to produce a first current (I4) proportional to a temperature within an operating range of the source; and a second electrical current source (CPTAT 102) adapted to produce a second current (I5) inversely proportional to the temperature;

characterised in that the first and second current sources are installed in parallel, and in that the voltage source comprises means (R3) of summating the first and second currents producing a reference current in the summation means generating the reference voltage (VREF) at the terminals of the summation means;

wherein the second current source comprises:

second current generation means adapted to produce at least one sixth current (I3) inversely proportional to the temperature; and a second current mirror adapted to produce the second current (I5) as a function of the at least one sixth current; and wherein the second current generation means comprise:

at least one second operational amplifier (A2) and at least one transistor (M5) adapted to produce the at least one sixth current; and at least one bias resistance (R2) adapted to adjust the amplitude of the at least one sixth current.

13. Electrical voltage source according to claim 12, characterised in that the second current generation means comprise:

an operational amplifier among the at least one second operational amplifier with first and second inputs;

a fourth field effect transistor (M5) adapted to produce a seventh current (I3); and a second bias resistance (R2) adapted to adjust the amplitude of the seventh current;

the fourth field effect transistor forming the second current mirror with a fifth field effect transistor (M4) such that the second current is a function of the seventh current;

the drain of the fourth field effect transistor being connected to the second input of the operational amplifier and to the first terminal of the second bias resistance;

the second terminal of the second bias resistance being connected to the first voltage potential;

the first input of the operational amplifier being connected to the emitter of the first bipole transistor;

the drain of the first field effect transistor being connected to the first input of the operational amplifier among the at least one second operational amplifier; and the output from the operational amplifier being connected to each of the gates of the fourth and fifth field effect transistors.

14. Voltage source according to claim 13, characterised in that it also comprises:

a bias source (100) to supply a starter current (ibias) and/or voltage (vbias) to the first and second current sources and to the summation means;

means of starting the first and second current sources and the summation means, the summation means being powered by the starter voltage.

15. Voltage source according to claim 14, characterised in that the starter means comprise sixth, seventh and eighth field effect transistors (M6, M7, M8), the gate of each of the transistors being powered by the starter voltage and the source of each of the transistors being powered by a power supply voltage from the voltage source;

the drain of the sixth field effect transistor being connected to the drain of the first field effect transistor;

the drain of the seventh field effect transistor being connected to the drain of the second field effect transistor; and the drain of the eighth field effect transistor being connected to the drains of the third and fifth field effect transistors.

16. Electrical voltage source according to claim 12, charcterised in that a variation of the second current as a function of the temperature compensates for a variation of the first current as a function of the temperature, such that the reference current is independent of the temperature.

17. Electrical voltage source according to claim 12, characterised in that a variation of the second current as a function of the temperature does not compensate for a variation of the first current as a function of the temperature, such that the reference current does depend on the temperature.

18. Electrical voltage source according to claim 17, characterised in that a variation in the reference current is proportional to a variation in the temperature.

19. Temperature sensor and/or temperature threshold detector comprising an electrical voltage source (500) according to claim 17, characterised in that the temperature sensor and/or the temperature threshold detector also comprise means (501) of measuring the reference voltage (VTEMP).

20. Temperature sensor and/or temperature threshold detector according to claim 19, characterised in that the temperature sensor and/or the temperature threshold detector also comprise:

means of generating a voltage (VREF) independent of the temperature within the operating range; and means (501) of comparison of the reference voltage and the voltage independent of the temperature.

21. Electronic chip comprising a voltage source according to claim 12.

22. System comprising a voltage source according to claim 12 and an electronic device powered by the voltage source.

23. System according to claim 22, characterised in that the device belongs to the group consisting of:

analogue/digital and/or digital/analogue converters;

microprocessor cards;

radio-telephones;

battery charge regulation circuits;

electronic devices dedicated to vehicles;

temperature sensors;

electrical power supply supervisors;

digital/analogue and/or analogue/digital conversion devices;

reset circuits;

electronic devices dedicated to spacecraft;

electronic devices dedicated to military vehicles; and audio or audiovisual devices.

* * * * *

UNITED STATES PATENT AND TRADEMARK OFFICE
CERTIFICATE OF CORRECTION

| | |
|---|---|
| PATENT NO. | : 6,930,538 B2 |
| APPLICATION NO. | : 10/616226 |
| DATED | : August 16, 2005 |
| INVENTOR(S) | : Joel Chatal |

It is certified that error appears in the above-identified patent and that said Letters Patent is hereby corrected as shown below:

Column 11, Line 42, delete "M6, M7 and M5", insert --M6, M7 and M8--

Signed and Sealed this

Seventh Day of August, 2007

JON W. DUDAS
*Director of the United States Patent and Trademark Office*